Oct. 13, 1942.                J. MIHALYI                2,298,404
                    POCKET RANGE FINDER CONSTRUCTION
                         Filed Aug. 12, 1941
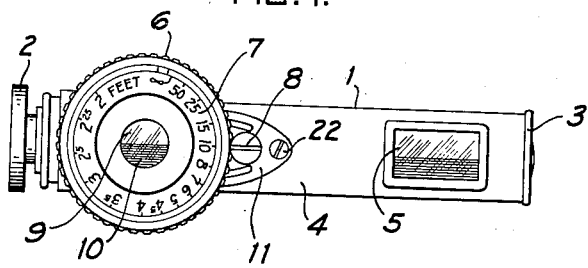
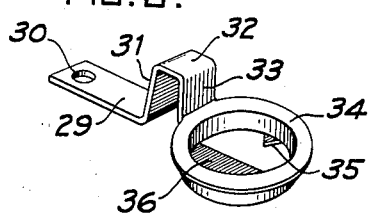
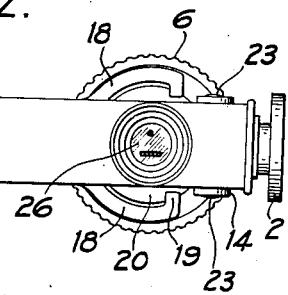
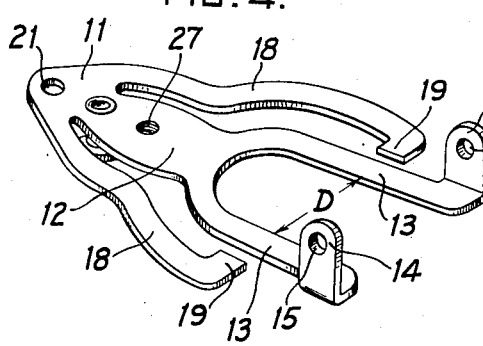
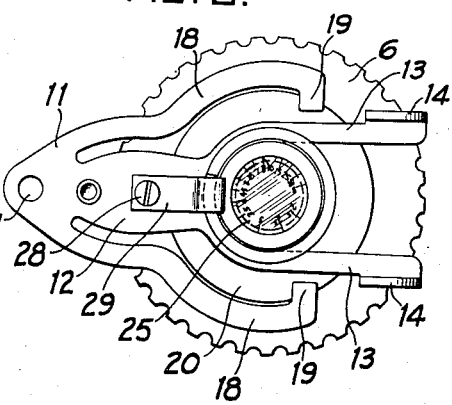
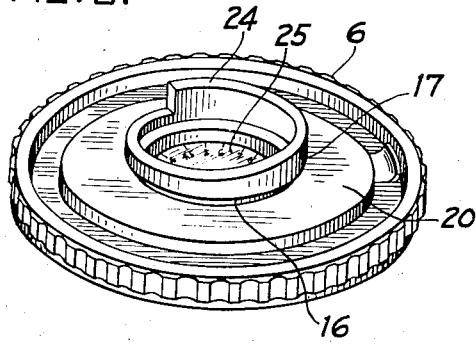
JOSEPH MIHALYI
    INVENTOR
BY Newton M. Perkins
   Donald H. Stewart
            ATTORNEYS Patented Oct. 13, 1942

2,298,404

UNITED STATES PATENT OFFICE 2,298,404

POCKET RANGE FINDER CONSTRUCTION

Joseph Mihalyi, Rochester, N. Y., assignor to Eastman Kodak Company, Rochester, N. Y., a corporation of New Jersey Application August 12, 1941, Serial No. 406,502

12 Claims. (Cl. 88—2.4)

This invention relates to the construction of optical instruments, and more particularly to a frictional bearing for use in optical instruments such as pocket range finders. One object of my invention is to provide a simple bearing structure for accurately supporting a rotatable or oscillatable part in accurate registration with other parts of the optical instrument. Another object of my invention is to provide a bearing for a moving part in which the part may move against a light and readily controllable frictional resistance. Another object of my invention is to provide a mount or removable part of an optical instrument which can be easily and quickly assembled, and other objects will appear from the following specification, the novel features being particularly pointed out in the claims at the end thereof.

Coming now to the drawing, wherein like reference characters denote like parts throughout:

Fig. 1 is a front elevation of an optical instrument in the form of a pocket range finder constructed in accordance with and embodying a preferred form of my invention;

Fig. 2 is a rear elevation of the range finder shown in Fig. 1;

Fig. 3 is a perspective view of a mask portion of the range finder before being assembled;

Fig. 4 is a perspective view of the dial mounting bracket before being assembled and on an enlarged scale;

Fig. 5 is a plan view on an enlarged scale of the dial and dial mounting bracket assembled together before being placed on the range finder; and Fig. 6 is an enlarged perspective view showing the focusing dial removed from the rest of the range finder.

In optical instruments, such as pocket photographic range finders, it has been difficult to keep the cost of these instruments relatively low because the parts require accurate workmanship to be of any value. As in most optical instruments the various parts must be accurately positioned with respect to other parts. It has been in the past comparatively expensive to mount a movable part of an optical instrument and it is to this portion of the apparatus that my invention is particularly directed.

In known types of pocket range finders an oscillatable or rotatable dial is provided for adjusting the range finder to various distances. This focusing dial carries a portion of the optical equipment so that it must be accurately mounted with respect to the remaining optics of the range finder and, in addition, it must turn smoothly and easily and remain in any set position. It is also necessary to provide a suitable bearing for this dial and it is desirable to have the bearing so that it may be readily assembled and disassembled to facilitate and speed up production. Ordinarily a good bearing fit between two mating cylindrical members is comparatively expensive. By eliminating such a bearing fit and by providing a single bracket which holds the dial on the range finder and which provides the necessary friction, I have eliminated considerable expense in making and assembling the usual type of photographic pocket range finder.

Referring now to the drawing, the optical instrument may be a range finder of the type commonly used in photography. It may comprise a casing member or body of a square tubular shape 1 which is provided with a stud 2 on one end by which it may be attached to the usual type of instrument attaching bracket on a camera. The opposite end may have a closure 3. Inside of the square tube 1 there may be any of the usual type of range finder mechanism.

One wall 4 of the range finder may support a window 5 forming a part of the range finder optics and a movable dial 6 which in this case bears a footage scale 7 which may be brought opposite to a pointer 8 to indicate the distance setting of the instrument. As indicated in Fig. 1, the range finder is here shown as adjusted to 10 feet. The dial is provided with a window 9 which is masked at 10 so that a portion of the split image may pass through this window.

My invention is particularly directed to the mounting of the dial 6 and a bracket 11 best shown in Figs. 4 and 5. This bracket is punched out of sheet stock and is provided with a central or base portion 12 from one end of which a pair of arms 13 are formed and on the end of these arms there are a pair of upstanding lugs 14 perforated at 15. The distance D between these arms 13 is such that the inner edges thereof engage a groove 16 cut in the cylindrical member 17 of the dial 6 as best shown in Fig. 6. From the rear of the base 12 there are a pair of outwardly extending arms 18 having inwardly formed ends 19, these ends being of such a shape that they may engage a flat wall 20 on the rear of the dial plate 6 and may have frictional contact therewith. The rear end of the base portion 12 has a perforation 21 so that this bracket may be attached to the square tube body member 1 by means of a screw 22 passing through the perforation 21 and by means of screws 23 passing through the perforations 15. Thus the bracket 12 may be readily assembled to the range finder casing 1 by these three screws.

The tubular portion 17 of the dial plate 6, as shown in Fig. 6, may carry a cam 24 which may be used to operate the movable optical mirror in the range finder casing and inside of the tubular member 17 there is preferably mounted a scale plate 25 bearing graduations of distance corresponding to the graduations of distance on the dial plate 7. Thus, in looking through the range finder window 26, it is possible to view the distance graduations 25 opposite a pointer in the optical instrument, so that the focus can be viewed at the same time that the parts of the image focused upon are brought into registration.

The base 12 of the bracket is provided with a tapped opening 27 which may receive a screw 28 to hold the masking bracket 29 in position, this screw passing through a perforation 30 in the bracket. This bracket is bent upwardly, outwardly and downwardly as indicated at 31, 32 and 33 so that the bracket will clear the cam 24. On the end of the bracket there is a ring 34 bearing a pointer 35 for the scale 25 and including a masking plate 36 to mask off a portion of the split image.

In assembling the range finder after the parts have been assembled in a square tube 1, the dial plate 6 is assembled by dropping the transparent scale plate 25 into place by sliding the arms 13 into the groove 16 in the annular member. The dial may then be turned, and, if it turns too freely, the bracket 12 may be removed from the groove 16 and the arms 18 bent manually, after which these parts may be reassembled. This will increase the tension of the ends 19 of the arms 18 bearing on the flat surface 20 and will produce the desired friction. The bracket 29 is then attached by passing the screw 28 through the opening 30 and into the tapped opening 27. With the parts assembled as shown in Fig. 5, the dial and bracket are placed on the range finder casing and are attached thereto by the screws 22 and 23. Thus, it is a simple matter to accurately position the dial plate 6 on the range finder and to hold the various parts in an accurate assembled relationship. It is also a simple matter, by manually bending the arms 18 to or from the flat surface 20 of the dial plate, to control the amount of friction on the dial plate and to obtain that comparatively light friction which is desirable in instruments of this type. It is only necessary to provide such friction as will hold the dial plate in a set position and it is never desirable to add so much friction that the dial turns with difficulty. Because of the shape of the arms 19 with their inwardly extending ends 18, it is difficult, if not impossible, to obtain too much friction in an initial setup.

What I claim as new and desire to be secured by Letters Patent of the United States is:

1. For use on an optical element having a body member with a bearing aperture and tapped holes therein, a bearing comprising a sheet metal spider-like bracket, a plurality of spaced arms carried by the bracket, two of said arms being adapted to support a slotted cylindrical member in the aperture of the body member, other of said arms being adapted to form frictional spring tensioning arms, and at least three widely spaced apertures in the bracket through which screws may pass into the tapped holes to attach the bracket to the body member.

2. For use in an optical instrument including a body member having a bearing aperture and threaded holes therein, a dial and bearing assembly to be mounted thereon comprising a dial including a slotted tubular extension, a bracket, arms on the bracket engaging a material portion of the slot in the tubular member, means carried by the bracket for frictionally engaging said dial, and spaced apertures in said bracket so located that said assemblage may be attached to said body member by screws passing into said threaded holes.

3. For use in an optical instrument including a body member having a bearing aperture and threaded holes therein, a dial and bearing assembly to be mounted thereon comprising a dial including a slotted tubular extension, a bracket, arms on the bracket engaging a material portion of the slot in the tubular member, means carried by the bracket for frictionally engaging said dial, means for holding said tubular extension in engagement with the arms of said bracket, and spaced apertures in said bracket so located that said assemblage may be attached to said body member by screws passing into said threaded holes.

4. For use in an optical instrument including a body member having a bearing aperture and threaded holes therein, a dial and bearing assembly to be mounted thereon comprising a dial including a slotted tubular extension, a bracket, arms on the bracket engaging a material portion of the slot in the tubular member, means carried by the bracket for frictionally engaging said dial, means for holding said tubular extension in engagement with the arms of said bracket, comprising an annular ring carrying a mask, an arm on the ring attached to the bracket, and spaced apertures in said bracket so located that said assemblage may be attached to said body member by screws passing into said threaded holes.

5. For use in an optical instrument including a body member having a bearing aperture and threaded holes therein, a dial and bearing assembly to be mounted thereon comprising a dial including a slotted tubular extension, a bracket, arms on the bracket engaging a material portion of the slot in the tubular member, means carried by the bracket for frictionally engaging said dial, means for holding said tubular extension in engagement with the arms of said bracket, a flange inside the slotted tubular extension, a scale plate positioned on one side by said flange and on the other side by said ring, and spaced apertures in said bracket so located that said assemblage may be attached to said body member by screws passing into said threaded holes.

6. For use in an optical instrument including a body member having a bearing aperture and threaded holes therein, a dial and bearing assembly to be mounted thereon comprising a dial including a slotted tubular extension, a bracket, arms on the bracket engaging a material portion of the slot in the tubular member, means carried by the bracket for frictionally engaging said dial, means for holding said tubular extension in engagement with the arms of said bracket, a pointer carried by said ring positioned to cooperate with said scale plate, and spaced apertures in said bracket so located that said assemblage may be attached to said body member by screws passing into said threaded holes.

7. For use in an optical instrument including a body member having a bearing aperture and threaded holes therein, a dial and bearing assembly to be mounted thereon comprising a dial including a slotted tubular extension, a bracket, arms on the bracket engaging a material portion of the slot in the tubular member, means carried by the bracket for frictionally engaging said dial, means for holding said tubular extension in engagement with the arms of said bracket, said arm including a portion U-shaped in cross section for bridging the end of the slotted tubular member, and spaced apertures in said bracket so located that said assemblage may be attached to said body member by screws passing into said threaded holes.

8. A dial support for use on optical instruments for dials including a grooved trunnion and including a bracket, pairs of spaced arms carried by said bracket including apertured lugs on the ends of one set of arms for attachment to an optical instrument, the other set of arms including pressure producing members positioned to frictionally engage a portion of the dial, said first mentioned arms engaging said slotted trunnion to hold the dial on the optical instrument.

9. A dial support for use on optical instruments for dials including a grooved trunnion and including a bracket, pairs of spaced arms carried by said bracket of substantially U-shape, one pair of arms partially enclosing another pair of arms, and including apertured lugs on the ends of one set of arms for attachment to an optical instrument, the other set of arms including pressure producing members positioned to frictionally engage a portion of the dial, said first mentioned arms engaging said slotted trunnion to hold the dial on the optical instrument.

10. A dial support for use on optical instruments for dials including a grooved trunnion comprising a sheet metal bracket, a pair of arms of U-shape having a bearing edge surface adapted to enter the groove in the trunnion and contact therewith through approximately 180°, and means on the ends of the arms and on the opposite end of the bracket for attaching said bracket to an optical instrument.

11. A dial support for use on optical instruments for dials including a grooved trunnion comprising a sheet metal bracket, a pair of arms of U-shape having a bearing edge surface adapted to enter the groove in the trunnion and contact therewith through approximately 180°, a second pair of bendable arms positioned to frictionally engage said dial plate, and means on the ends of the arms and on the opposite end of the bracket for attaching said bracket to an optical instrument.

12. In an optical instrument, the combination with a body member having a bearing aperture therein, a dial, a slotted tubular extension on said dial extending into said bearing aperture, a bracket attached to the body member, spaced arms on the bracket engaging a material part of the slot in the tubular extension for rotatably holding the dial on the body member, and spaced connections between the bracket and body, member for holding the parts in assembled relation.

JOSEPH MIHALYI.